United States Patent [19]

Ueno et al.

[11] 4,200,225
[45] Apr. 29, 1980

[54] DIAGNOSTIC CHECK SYSTEM FOR DIGITAL SIGNAL CIRCUIT

[75] Inventors: Masahiro Ueno; Ikuro Masuda, both of Hitachi, Japan

[73] Assignee: Hitachi, Ltd., Japan

[21] Appl. No.: 912,316

[22] Filed: Jun. 5, 1978

[30] Foreign Application Priority Data

Jun. 6, 1977 [JP] Japan ................................. 52/65796

[51] Int. Cl.$^2$ ...................... G01R 31/28; G06F 11/00
[52] U.S. Cl. .................................... 371/27; 324/73 R
[58] Field of Search .................. 235/302, 302.3, 302.4; 324/73 R

[56] References Cited

U.S. PATENT DOCUMENTS

| | | | |
|---|---|---|---|
| 3,657,527 | 4/1972 | Kassabgi et al. | 235/302 |
| 3,680,069 | 7/1972 | Neumann et al. | 235/302 |
| 3,714,571 | 1/1973 | Walker | 235/302 |
| 3,916,306 | 10/1975 | Patti | 324/73 R |
| 3,976,940 | 8/1976 | Chau et al. | 324/73 R |
| 4,061,908 | 12/1977 | de Jonge et al. | 235/302.3 |

Primary Examiner—Charles E. Atkinson
Attorney, Agent, or Firm—Craig & Antonelli

[57] ABSTRACT

A diagnostic check system for a digital signal circuit, in which, in a state where a plurality of digital signals are being sent out from a processor such as a microcomputer through an interface and photo-coupling elements to a controlled apparatus, the processor periodically processes all the digital signals to simultaneously cause them to be the same signal mode "1" or "0" for a period of time that is too short for the controlled apparatus to respond to the change in the levels of the digital signals, and the processor also detects whether the modes of all the signals transferred from the photo-coupling elements to the controlled apparatus for the short period of time are coincident or not.

18 Claims, 9 Drawing Figures

DIAGNOSTIC CHECK SYSTEM FOR DIGITAL SIGNAL CIRCUIT

BACKGROUND OF THE INVENTION

This invention relates to an improvement in a diagnostic check system for a digital signal circuit which leads digital signals from a processor such as a microcomputer to a controlled apparatus.

Whereas processors such as microcomputers or minicomputers treat only information or data in their internal circuits, an interface including decoders, buffers and gates and a digital signal circuit including voltage level changers must process not only information or data but also power to drive relays so that they are liable to incur faults. This tendency to easily cause faults adversely affects the reliability of the system.

To eliminate such a drawback, a variety of diagnostic check systems for a digital signal circuit have been hitherto proposed. For example, the Japanese Patent Laid-Open publication No. 50667/77 laid open for public inspection on Apr. 22, 1977 discloses a system for transmitting digital signals from a computer to a controlled apparatus through an interface including relay drivers, in which diagnostic check is performed by detecting how the output signals of the relay drivers change under the signal conditions given by the computer and then by returning the detected signals to the computer. With this diagnostic check system, however, the diagnostic check of, for example, sixteen digital circuits needs test stages having twenty conditions imposed by the computer. Moreover, since each test stage forms a diagnostic system in which two sets of relays are connected in series with each other by the relay drivers and relay receivers, much time is consumed for the diagnostic of faults due to the delays of operation of relays so that it is difficult to perform diagnostic checks in an active state of or during the operation of the controlled apparatus.

SUMMARY OF THE INVENTION

The object of this invention is to provide, in a digital signal circuit for controlling a controlled apparatus by sending plural digital signals from a processor to the controlled apparatus, a diagnostic system which is capable of performing diagnostic checks while the controlled apparatus is being operated.

The feature of the diagnostic check system for a digital signal circuit, according to this invention is the provision of (a) a processor for delivering a plurality of digital signals each representing binary information, i.e. a selected one of the first and the second modes;

(b) a controlled apparatus adapted to receive the plurality of digital signals;

(c) means for making the modes of the plurality of digital signals all coincident for a period that is too short for the controlled apparatus to be sensitive to the changes in the digital signals; and (d) means for detecting the coincidence of the modes of all the digital signals during the short period.

Each digital signal carries binary information consisting of a first and a second mode such as "1" and "0" "high" and "low" or "on" and "off". A processor such as a microcomputer or a minicomputer sends the digital signals as described above to the controlled apparatus. The controlled apparatus, having received the digital signals, usually operates machinery via relays. In most cases, the controlled apparatus cannot sense the change in the input signal which only lasts less than 10 msec. while the processor such as a computer has such a fast processing speed that it may temporarily change the modes of its output signals only within 10 msec. Then, during the short period, the modes of all the digital signals are made coincident and detection is made whether the modes of all the digital signals supplied to the controlled apparatus are coincident or not, so that the diagnostic check of the digital signal circuit which is disposed at the stage after the processor can be carried out at the active status wherein the controlled apparatus is operating.

DESCRIPTION OF THE PREFERRED EMBODIMENTS

This invention will now be described by way of embodiments with the aid of the attached drawings.

Figure 1:
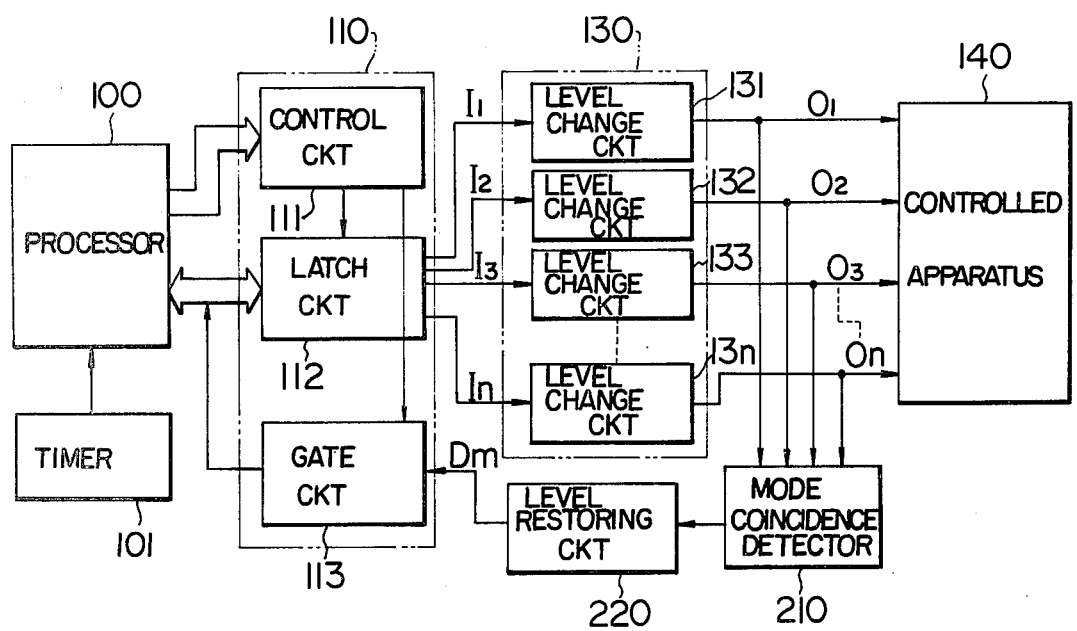
FIG. 1 shows in block diagram a diagnostic check system for a digital signal circuit, as an embodiment of this invention.

In FIG. 1, reference numeral 100 indicates a processor such as a microcomputer or a minicomputer and numeral 110 designates an interface therefor. The interface 110 comprises a control circuit 111 including an address decoder and a timing circuit, a latch circuit 112 and a gate circuit 113. According to the instruction from the control circuit 110, the latch circuit 112 delivers a plurality of digital signals $I_1, I_2, I_3, \ldots, I_n$. These digital signals are signals each having such a low level as to be available for transistor-transistor logic (hereinafter referred to as TTL for short) and therefore a voltage level changing circuit 130 is provided to change such a TTL voltage level of each of the signals $I_1, \ldots I_n$ to a level high enough to drive, for example, relays in the controlled apparatus 140. The circuit 130 is composed of a plurality of voltage level changing units 131, 132, ..., 13n whose respective digital output signals $0_1, 0_2, 0_3, \ldots 0_n$ are used to control the controlled apparatus 140.

Figure 2:
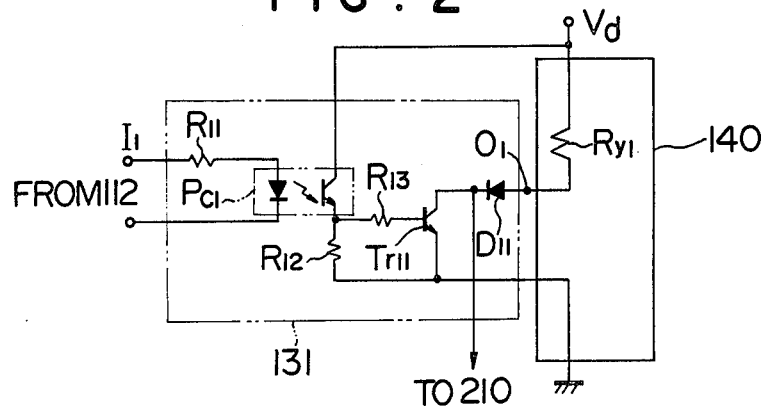
FIG. 2 shows an electric circuit of a level changer used in the system shown in FIG. 1.

FIG. 2 shows a particular example of the level changing unit 131 of the level changing circuit 130. The digital signal $I_1$ delivered from the latch circuit 112 is supplied to the light emitting diode of a photo-coupling element $P_{c1}$ through a resistor $R_{11}$. The photo-transistor of the photo-coupling element $P_{c1}$ is connected with a dc power source $V_d$ having a relatively high voltage, through a resistor $R_{12}$. The voltage developed across the resistor $R_{12}$ is applied between the base and the emitter of a transistor $T_{r11}$ through a resistor $R_{13}$. Through the transistor $T_{r11}$ and a diode $D_{11}$, a relay $R_{y1}$ in the controlled apparatus 140 is connected with the dc power source $V_d$. Accordingly, if the digital signal $I_1$ is at a level of logic "1", the transistor $T_{r11}$ is turned "ON" via the photo-coupling element $P_{c1}$ to energize the relay $R_{y1}$. Thus, when the level of signal $I_1$ is of logic "1" and hence signal $0_1$ is at its "low" level the relay $R_{y1}$ is energized. In this sense, the "low" level of the signal 0 is defined as logic "1" and the status of logic "1" of the signals $I_1$ and $0_1$ is hereinafter referred to as signal mode "1". Accordingly, the signal mode "0" represents the logic "0" level for the signal $I_1$ on one hand and the logic "0" or "high" level for the signal $0_1$ on the other.

The circuit configuration of each of the remaining level changing units 132, 133, . . . , 13n may be similar to that of this unit 131 as shown in FIG. 2. Referring again to FIG. 1, the reference numeral 101 designates a timer to produce periodically pulses. The thus produced pulses are applied to the processer 100 as interrupt signals so as to define the control period of the processor 100 or the short period for a diagnostic test which will be described hereinafter.

With this digital signal circuit, if a fault occurs in, for example, the interface 110 or the level changing circuit 130 between the processor 100 and the controlled apparatus 140, the controlled circuit 140 may operate erroneously.

Therefore, in order to check whether the controlled circuit operates normally, while the processor 100 is delivering digital signals and the controlled apparatus is operating, the processor 100 is caused to process the digital signals $I_i$ ( $i=1 \sim n$) and $0_i$ ($i=1 \sim n$) in such a manner that the modes of all the signals $I_i$ and $0_i$ become coincident, only during a very short period. The very short period is selected to be such a duration of time that is too short for the controlled apparatus to respond to the changes in the digital signals $0_i$ ($i=1 \sim n$) and therefore to be affected by the changes. For example, a relay has a delay in operation of several tens of milliseconds, usually about 30 msec. in practice, and if the short period is chosen to be, for example, $2 \sim 3$ msec., the relay $R_{y1}$ remains insensitive.

In FIG. 1, a mode coincidence detecting circuit 210 detects whether the modes of all the digital signals $0_1$, $0_2$, . . . , $0_n$ are coincident or not. A level restoring circuit 220 changes the voltage level capable of driving relays to the TTL level. The mode coincidence judging signal $D_m$ obtained from the level restoring circuit 220 is supplied to the gate circuit 113 of the interface 110. According to the instruction from the control circuit 111, the gate circuit 113 takes the mode coincidence judging signal $D_m$ into the processor 100 during the short period described above. The processor 100 diagnoses the digital signal circuit to be faultless if the signal $D_m$ represents that the modes of all the digital signals $0_i (i=1 \sim n)$ are coincident while the processor 100 judges the digital signal circuit to be faulty if the signal $D_m$ indicates that all the signal modes are not coincident.

Figure 3:
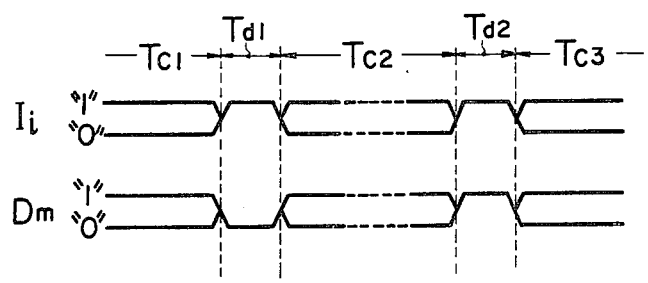
FIG. 3 shows a time chart useful in explaining the fundamental operation of the system according to this invention.

FIG. 3 is a time chart useful in explaining the fundamental operation of the system described above.

Now, let it be assumed for convenience' sake that all the digital signals $I_i$ ($i=1 \sim n$) are correct and that only a possible fault in the level changing circuit 130 is to be diagnosed. During the periods $T_{c1}$, $T_{c2}$ and $T_{c3}$ for which ordinary control operations take place, the respective digital signals $I_i (i=1 \sim n)$ supplied to the level changing circuit 130 may take either signal mode "1" or signal mode "0" according to the respectively given control instructions. During these periods, therefore, the digital signals $0_i (i=1 \sim n)$ supplied to the controlled circuit 140 also may take either the signal mode "1" or signal mode "0" (not shown) according to the respective modes of the corresponding signals $I_i$ ($i=1 \sim n$). It does not matter which mode the mode coincidence judging signal $D_m$ takes, "0" to indicate a coincidence or "1" to indicate a non-coincidence.

Periods $T_{d1}$ and $T_{d2}$ are periodically inserted short durations of time lasting for $2 \sim 3$ milliseconds and during these periods all the digital signals $I_i$ ($i=1 \sim n$) are caused to take a selected one of the two modes, for example, mode "1". Accordingly, if the digital signal circuit is faultless during the period $T_{d1}$, all the digital signals $O_i$ ($i=1 \sim n$) supplied to the controlled circuit 140 take the same mode "1" so that the mode coincidence judging signal $D_m$ takes the mode "0" representing coincidence of the modes. On the other hand, assuming that the digital signal circuit has a fault during the period $T_{d2}$, the digital signals $O_i (i=1 \sim n)$ supplied to the controlled apparatus 140 may include one or more signals taking mode "0" in the signals taking mode "1" so that the signal $D_m$ takes the mode "1" representing non-coincidence of the modes. By discriminating between the modes "1" and "0" of the mode coincidence judging signal by the processor 100, the diagnostic check of the digital signal circuit may be performed while the controlled apparatus is operating.

Figure 4:
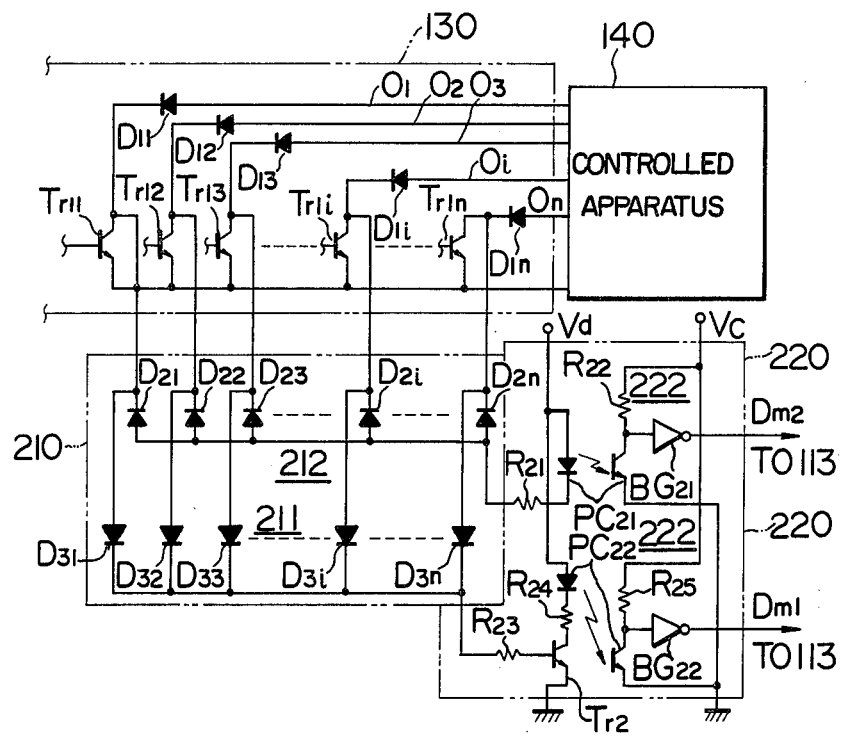
FIG. 4 shows concrete electric circuits of the output section of the level changer, a mode coincidence detecting circuit and a level restoring circuit.

FIG. 4 shows particular examples of the output portion of the level changing circuit 130, the mode coincidence judging circuit 210 and the level restoring circuit 220 in the diagnostic check system shown in FIG. 1. Just as the first level changing unit 131 has the transistor $T_{r11}$ and the diode $D_1$ as shown in FIG. 2, the second, third, . . . , i-th, . . . , and n-th level changing units 132, 133, . . . , 13i, . . . , and 13n also have a transistor $T_{r12}$ and a diode $D_{12}$, a transistor $T_{r13}$ and a diode $D_{13}$, . . . , a transistor $T_{r1i}$ and a diode $D_{1i}$, . . . , and a transistor $T_{r1n}$ and a diode $D_{1n}$, respectively. The digital signals $0_1, 0_2$, . . . , $0_i$, . . . , $0_n$ as the respective outputs of the level changing units 131, 132, . . . , 13i, . . . , 13n are received as inputs by the controlled apparatus 140. The mode coincidence detecting circuit 210 is composed of first and second mode coincidence detecting units 211 and 212. These units 211 and 212 are wired-OR circuits which are composed of a first set of diodes $D_{31}, D_{32}$, . . . , $D_{3i}$, . . . , and $D_{3n}$ and a second set of diodes $D_{21}$, $D_{22}$, . . . , $D_{2i}$, . . . , and $D_{2n}$, respectively.

The level restoring circuit 220 is composed of first and second circuit units 221 and 222. The first circuit unit 221 comprises resistors $R_{23}$, $R_{24}$ and $R_{25}$, a transistor $T_{r2}$, a photo-coupling element $P_{c22}$, and a buffer gate (inverter) $BG_{22}$. The second circuit unit 22 comprises a resistor $R_{21}$, a photo-coupling element $P_{c21}$, a resistor $R_{22}$ and a buffer gate (inverter) $BG_{21}$. A power source $V_d$ has a relatively high voltage and a power source $V_c$ has a low voltage of TTL level.

The first mode coincident judging signal $D_{m1}$ is obtained in such a manner as follows. Namely, only when all the transistors $T_{r1i} (i=1 \sim n)$ are turned on, the first mode coincidence detecting circuit unit 211 delivers a low level output to cut off the transistor $T_{r2}$. As a result, the voltage of the power source $V_c$ is applied to the input of the buffer gate $BG_{22}$ so that the first mode coincidence judging signal $D_{m1}$ takes the mode "0". If all the transistors $T_{rli}$ ($i=1\sim n$) are not conductive, on the contrary, the signal $D_{m1}$ takes the mode "1". Since it is so defined that when the transistor $T_{rli}$ is conductive, the digital signal $O_{1i}$ takes the mode "1", the first judging signal $D_{m1}$ is expressed as $$D_{m1}=\overline{O_1.O_2\ldots O_i\ldots O_n}.$$

In like manner, the second mode coincidence judging signal $D_{m2}$ obtained from the second mode coincidence detecting circuit unit 212 through the second level restoring circuit unit 222 takes the mode "0" only when all the transistors $T_{rli}$ ($i=1\sim n$) are cut off and the mode "1" if all the transistors are not cut off. Namely, the second judging signal $D_{m2}$ is expressed as $$D_{m2}=O_1+O_2+\ldots+O_i+\ldots+O_n.$$

Figure 5A:
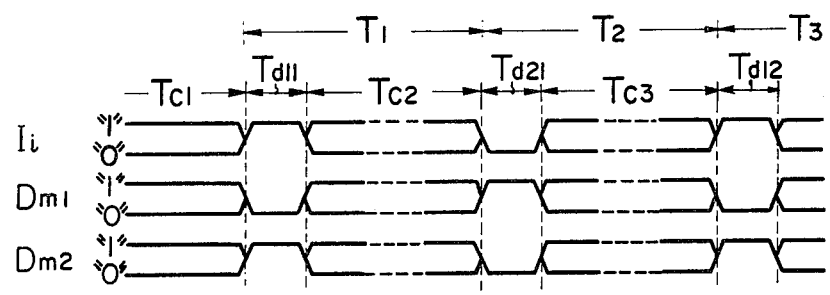
FIGS. 5A and 5B show time charts useful in explaining the operations of the respective circuits shown in FIG. 4.
Figure 5B:
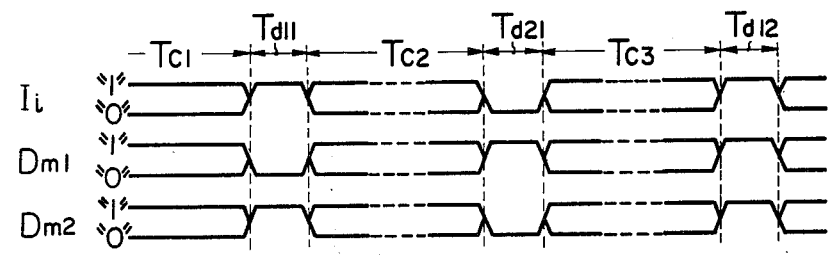

FIGS. 5A and 5B are time charts useful in explaining the diagnostic check of the digital signal circuit by using the circuits shown in FIG. 4. The processor is so designed as to cause all the digital signals $I_i$ ($i=1\sim n$) and hence $O_i$ ($i=1\sim n$) to have the same mode "1" during periods $T_{d11}$ and $T_{d12}$ and the same mode "0" during a period $T_{d21}$. In this case, as shown in FIG. 5A, the digital signal circuit is diagnosed to be faultless based on the fact that the mode coincidence judging signal $D_{m1}$ takes the mode "0" during the periods $T_{d11}$ and $T_{d12}$ and the judging signal $D_{m2}$ takes the mode "0" during the period $T_{d21}$.

On the other hand, the digital signal circuit is diagnosed to be faulty if the judging signal $D_{m1}$ takes the mode "1" during the period $T_{d11}$ and/or $T_{d12}$ or if the judging signal $D_{m2}$ takes the mode "1" during the period $T_{d21}$. FIG. 5B shows a case where a fault is detected based on the fact that the signal $D_{m1}$ takes the mode "1" during the period $T_{d12}$. This fact means that some of the digital signals $O_i$ ($i=1\sim n$) take the mode "0" in the case where all of them should take the same mode "1". This fault is the case where at least one of the transistors $T_{rli}$ ($i=1\sim n$) in FIG. 4 is erroneously turned off. If on the contrary at least one of the transistors $T_{rli}$ ($i=1\sim n$) is erroneously turned on, the judging signal $D_{m2}$ has the mode "1" during the period $T_{d21}$ (not shown).

In this way, the diagnostic check of the occurrence of a fault and the mode or type of the fault occurring is possible by periodically making the modes of all digital signals coincident, by alternating changing the coincident mode from one of "1" and "0" to the other, and by detecting the coincidences.

Figure 6:
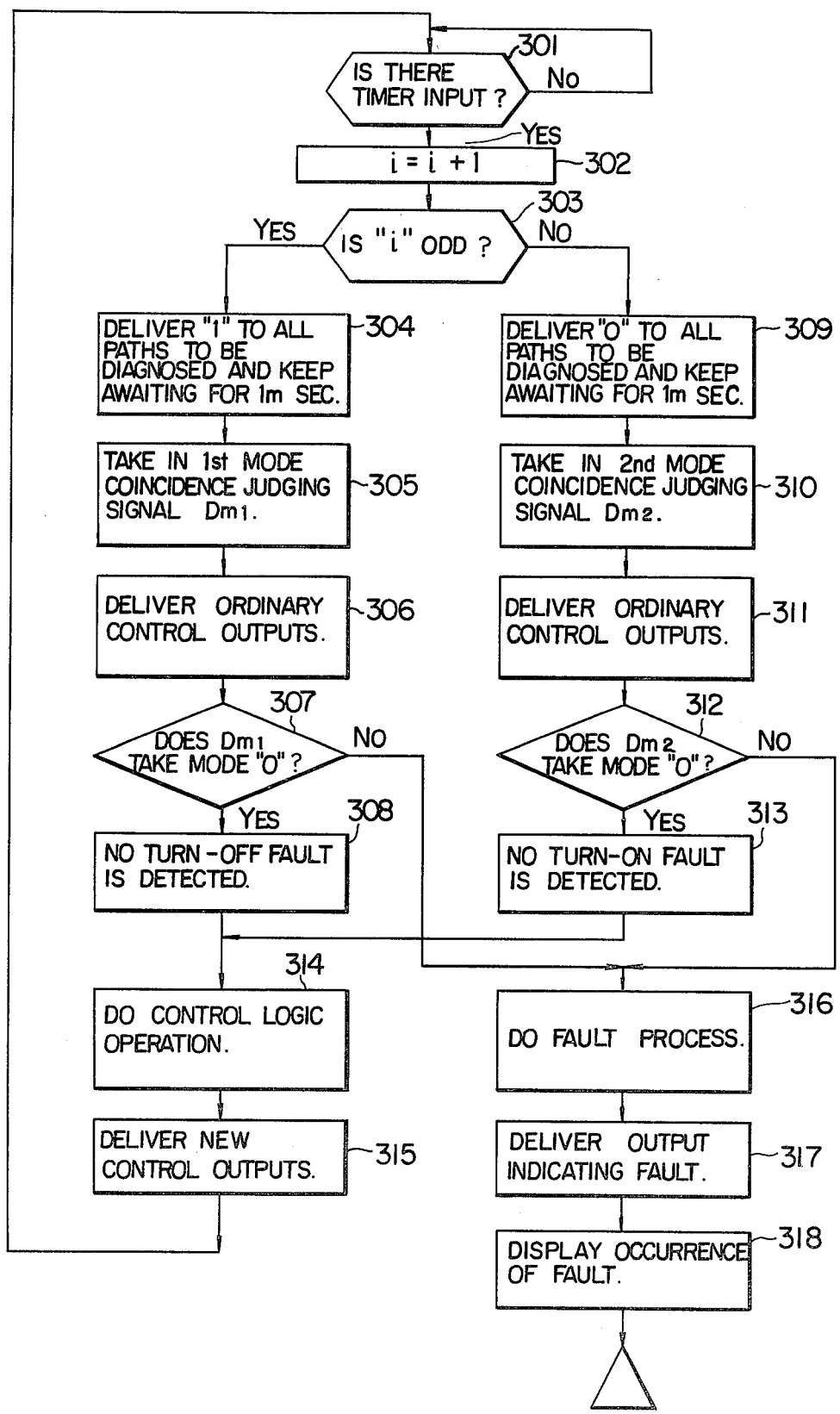
FIG. 6 is a flow chart representing a program for a processor.

FIG. 6 is a flow chart of a program to cause the processor 100 to perform the diagnostic check of faults as shown in FIGS. 5A and 5B. The diagnostic check is controlled in a manner of sampling synchronized with the output pulses of a timer which are generated at intervals with $T_1=T_2T_3$. For example, the repetition period of the pulses generated by the timer is selected to be 100 msec.

These pulses are detected (step 301) and counted (step 302). If the result of counting gives an odd number (step 303), the digital signal outputs now being delivered are temporarily interrupted and after the signal mode "1" has been delivered to all the paths of the digital signal circuit to be diagnostically checked, the system is kept awaiting for 1 msec. (step 304). This short wait is necessary for eliminating the influences of filter provided in the digital signal circuit. Then, the first judging signal $D_{m1}$ is taken in (step 305) to deliver the ordinary control outputs (digital signals) (step 306). If the first judging signal $D_{m1}$ takes the mode "0", the digital signal circuit is judged such that there is no turn-off fault (step 308). Accordingly, the control logic operation is performed (step 314) to result in the delivery of new control signals (digital signals) (step 315).

If the count of the timer input (pulses) equals an even number (step 303), the signal mode "0" is delivered to all the paths to be diagnosed (step 309). Thereafter, the steps 310 to 313 follow to perform a diagnostic check of a fault in which at least one of the transistors $T_{rli}$ ($i=1\sim n$) in the digital signal circuit is erroneously turned on.

When a fault due to the erroneous turn-off or turn-on of transistors is detected (step 307 or 312), such a fault process as to store desired information in non-volatile memory (e.g. core memory) is performed (step 316). Then, a predetermined diagnostic output is delivered (step 317), the occurence of a fault is displayed (step 318), and the processing is ended.

Figure 7:
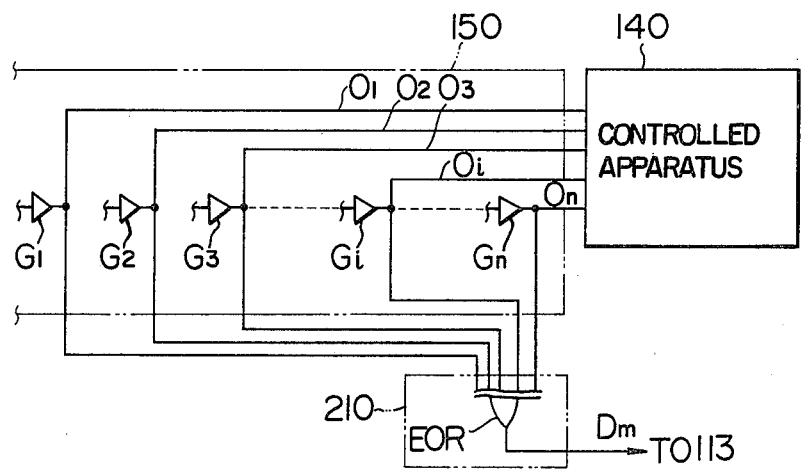
FIG. 7 shows concrete electric circuits of the output section of a level changer and a mode coincidence detecting circuit used in the system according to this invention.
Figure 8:
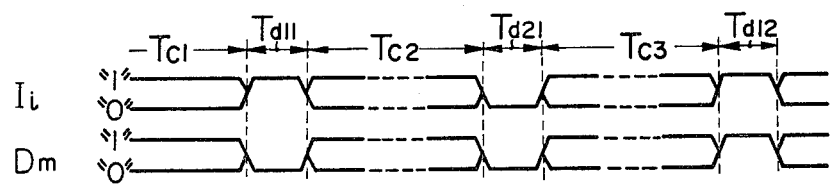
FIG. 8 is a time chart useful in explaining the operations of the circuits shown in FIG. 7.

FIG. 7 shows an electrical circuit of a diagnostic check system as another embodiment of this invention. In this embodiment, the level changing circuit 130 shown in FIG. 1 is omitted and the last stage of the digital signal circuit is constituted of buffer gates $G_i$ ($i=1\sim n$). Namely, the output signals $I_i$ ($i=1\sim n$) of the latch circuit 112 (FIG. 1) are applied to the respective buffer gates $G_i$ ($i=1\sim n$) of the output buffer gate circuit 150 instead of the level change circuit 130 (FIGS. 1, 2 or 4). In this case, the mode coincidence detecting circuit 210 may be an exclusive OR circuit EOR. The exclusive OR circuit EOR has a function equivalent to the combined functions of the first and second mode coincidence detecting circuit units 211 and 212 shown in FIG. 4. Namely, as shown in a time chart in FIG. 8, if there is no fault during the periods $T_{d11}$ and $T_{d21}$, the judging signal $D_m$ as the output of the exclusive OR circuit EOR takes the mode "0" during both the periods $T_{d11}$ and $T_{d21}$ and if a fault occurs in any path of the digital signal circuit during the period $T_{d12}$ or another period (e.g. $T_{d22}$, not shown), the judging signal $D_m$ takes the mode "1".

We claim:

1. A diagnostic check method for a digital signal circuit comprising a processor for delivering a plurality of digital signals each representing binary information which takes a selected one of a first and a second mode, a controlled apparatus which is supplied with said plurality of digital signals, and an interface connected between said processor and said controlled apparatus for transferring said digital signals, said method comprising the steps of making the modes of said plurality of digital signals produced by said processor all coincident for a very short period that is too short for said controlled apparatus to be sensitive to the changes in said digital signals, and detecting the coincidence of mode of all the digital signals applied to said controlled apparatus from said interface during said short period.

2. A diagnostic check method as claimed in claim 1, wherein said step of detecting the mode coincidence comprises the steps of delivering a judging signal which alternatively takes a first and a second mode when the modes of all said digital signals are coincident and when the modes of all said digital signals are not coincident, respectively, and discriminating between the modes of said judging signal during said short period.

3. A diagnostic check method as claimed in claim 1, comprising the step of actuating said processor to periodically set said short period.

4. A diagnostic method as claimed in claim 1, wherein said step of making signal modes coincident comprises the steps of causing said plurality of digital signals to take said first mode during a first one of said short periods, and causing said plurality of digital signals to take said second mode during a second one of said short periods.

5. A diagnostic check method as claimed in claim 4, comprising the step of actuating said processor to periodically and alternately set said first and second short periods.

6. A diagnostic method as claimed in claim 4, wherein said step of detecting the mode coincidence comprises the step of separately detecting the coincidence of the modes of said plurality of digital signals during said first short period and the coincidence of the modes of said plurality of digital signals during said second short period.

7. A diagnostic method as claimed in claim 1, wherein said step of detecting the mode coincidence is achieved by receiving said plurality of digital signals through a wired-OR circuit.

8. A diagnostic check method as claimed in claim 1, wherein said controlled apparatus includes a plurality of relays energized when a corresponding one of said digital signals takes predetermined one of said first and second modes.

9. A diagnostic check method as claimed in claim 1, wherein said step of detecting the mode coincidence is achieved by receiving said plurality of digital signals through an exclusive OR circuit.

10. A diagnostic check method for a digital signal circuit comprising a processor for delivering a plurality of digital signals each representing binary information which takes a selected one of a first and a second mode, level changing means for changing the voltage levels of said plurality of digital signals, and a controlled apparatus which is supplied with output signals of said level changing means, said method comprising the steps of making coincident the modes of all said plurality of digital signals supplied to said level changing means during a short period that is too short for said controlled apparatus to be sensitive to the changes in said digital signals, detecting the coincidence of modes of all said plurality of digital signals supplied to said controlled apparatus during said short period, and restoratively changing the voltage level of detected signals in said mode coincidence detecting step and supplying the level-restored output to said processor.

11. A diagnostic check method as claimed in claim 10, wherein said level changing means includes a photocoupling element.

12. A diagnostic check method as claimed in claim 10, wherein said step of detecting the mode coincidence comprises the step of always delivering a judging signal which alternatively takes a first and a second mode when the modes of all said digital signals are coincident and when the modes of all said digital signals are not coincident, respectively; and wherein said method further comprises the step of discriminating between the modes of said judging signal during said short period.

13. A diagnostic check method as claimed in claim 10, comprising the step of actuating said processor to periodically set said short period.

14. A diagnostic check system as claimed in claim 10, wherein said step of making digital signal modes coincident comprises the steps of causing said plurality of digital signals to take said first mode during a first one of said short periods and causing said plurality of digital signals to take said second mode during a second one of said short periods.

15. A diagnostic check method as claimed in claim 14, comprising the step of actuating said processor to periodically and alternately set said first and second short periods.

16. A diagnostic check method as claimed in claim 14, wherein said mode coincidence detecting step includes the step of separately detecting the coincidence of the modes of said plurality of digital signals during said first short period and the coincidence of the modes of said plurality of digital signals during said second short period.

17. A diagnostic check method as claimed in claim 10, wherein said step of detecting the mode coincidence is achieved by receiving said plurality of digital signals through a wired-OR circuit.

18. A diagnostic check method as claimed in claim 10 wherein said controlled apparatus includes a plurality of relays energized when a corresponding one of said digital signals takes a predetermined one of said first and second modes.

* * * * *